United States Patent
Tsuruga et al.

(10) Patent No.: US 12,347,334 B2
(45) Date of Patent: Jul. 1, 2025

(54) ROAD GUIDANCE SYSTEM AND MOBILE INFORMATION TERMINAL USED IN SAME

(71) Applicant: MAXELL, LTD., Kyoto (JP)

(72) Inventors: Sadao Tsuruga, Kyoto (JP); Tamotsu Ito, Kyoto (JP); Yasunobu Hashimoto, Kyoto (JP); Kazuhiko Yoshizawa, Kyoto (JP)

(73) Assignee: MAXELL, LTD., Kyoto (JP)

( * ) Notice: Subject to any disclaimer, the term of this patent is extended or adjusted under 35 U.S.C. 154(b) by 615 days.

(21) Appl. No.: 17/616,613

(22) PCT Filed: Jun. 6, 2019

(86) PCT No.: PCT/JP2019/022591
§ 371 (c)(1),
(2) Date: Dec. 3, 2021

(87) PCT Pub. No.: WO2020/245991
PCT Pub. Date: Dec. 10, 2020

(65) Prior Publication Data
US 2022/0230560 A1     Jul. 21, 2022

(51) Int. Cl.
*G09B 21/00* (2006.01)
*G06K 7/14* (2006.01)
*G08G 1/005* (2006.01)

(52) U.S. Cl.
CPC ......... *G09B 21/006* (2013.01); *G06K 7/1417* (2013.01); *G08G 1/005* (2013.01); *G09B 21/003* (2013.01)

(58) Field of Classification Search
CPC ....... G09B 21/006; G08G 1/005; A63H 3/066
See application file for complete search history.

(56) References Cited

U.S. PATENT DOCUMENTS

2007/0198180 A1    8/2007  Sakamoto
2013/0212046 A1*   8/2013  Henshue .............. B44C 5/0446
                                                          427/256

(Continued)

FOREIGN PATENT DOCUMENTS

JP    2002-058057 A    2/2002
JP    2003-296875 A   10/2003

(Continued)

OTHER PUBLICATIONS

International Search Report issued in corresponding International Patent Application No. PCT/JP2019/022591, dated Sep. 10, 2019, with English translation.

(Continued)

*Primary Examiner* — Peter R Egloff
(74) *Attorney, Agent, or Firm* — Rimon P.C.

(57) ABSTRACT

In a road guidance using a Braille block, it has not been possible to determine a walking direction of a user only by a single Braille block. To solve the above problem, in a road guidance system including a mobile information terminal and a Braille block, the mobile information terminal includes a photographing processing unit, a QR code analysis processing unit that analyzes a QR code, a voice output processing unit, and a control unit, a QR code is affixed to the Braille block, and the control unit analyzes the QR code affixed to the Braille block photographed by the photographing processing unit using the QR code analysis processing unit to obtain QR code information, generates road guidance information generated based on a walking direction of a user holding the mobile information terminal from the QR code information, and outputs the road guidance information from the voice output processing unit as a voice.

9 Claims, 8 Drawing Sheets

(56) References Cited

U.S. PATENT DOCUMENTS

| | | | | |
|---|---|---|---|---|
| 2015/0265491 | A1* | 9/2015 | Henshue | E01C 5/001 404/19 |
| 2016/0005334 | A1* | 1/2016 | Guo | G09B 21/006 348/62 |
| 2016/0180704 | A1* | 6/2016 | Chang | H04W 4/80 340/944 |
| 2017/0165147 | A1* | 6/2017 | Ng | A61H 3/061 |

FOREIGN PATENT DOCUMENTS

| | | |
|---|---|---|
| JP | 2005-36587 A | 2/2005 |
| JP | 2005-257738 A | 9/2005 |
| JP | 2007-017596 A | 1/2007 |
| JP | 2007-87366 A | 4/2007 |
| JP | 2007-164441 A | 6/2007 |
| JP | 2016-541065 A | 12/2016 |
| KR | 101614156 B1 | 4/2016 |
| WO | 2015084066 A1 | 6/2015 |

OTHER PUBLICATIONS

Japanese Office Action issued in corresponding Japanese Patent Application No. 2021-524611 dated May 9, 2023, with English translation.

Prtimes, "shikAI" Station Navigation System for the Visually Impaired to be Demonstrated, Jul. 30, 2018 https://prtimes.jp/main/html/rd/p/000000005.000012977.html, with English translation.

PORT by Creww, World's first technology to make train stations safer and more convenient to a safer and more convenient place, Braille blocks and QR codes show you the quickest route to your destination, Nov. 9, 2018 https://port.creww.me/crewwnews/1441, with English translation.

* cited by examiner

FIG. 1
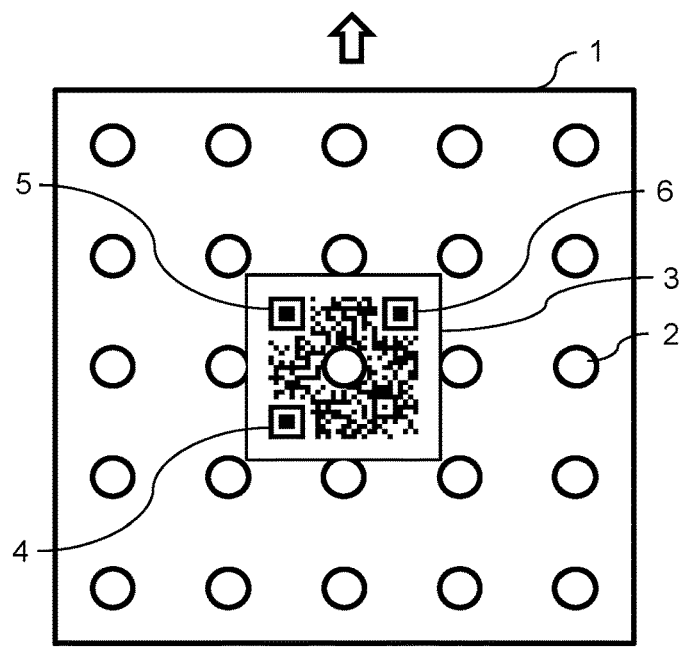
FIG. 2
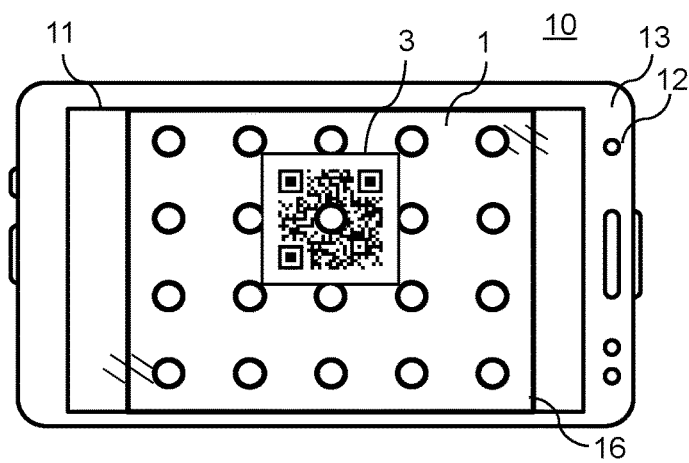
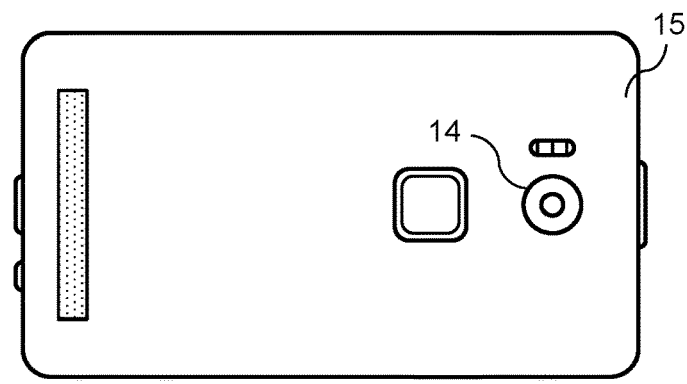

ROAD GUIDANCE SYSTEM AND MOBILE INFORMATION TERMINAL USED IN SAME

CROSS-REFERENCE OF RELATED APPLICATIONS

This application is the U.S. National Phase under 35 U.S.C. § 371 of International Application No. PCT/JP2019/022591, filed on Jun. 6, 2019, the entire contents of which is hereby incorporated by reference.

TECHNICAL FIELD

The present invention relates to a road guidance system using Braille blocks.

BACKGROUND ART

In recent years, consideration has been given to visually impaired people, and there are increasing opportunities to see visually impaired people using white canes move by relying on Braille blocks.

Braille blocks are installed on public facilities such as a station yard and sidewalks at intersections to assist the visually impaired people in moving.

According to the description of JIS T9251-2001, there are two types of Braille blocks, a guidance block (linear protrusion) and a warning block (dot-shaped protrusion).

In the guidance block, four or more rod-shaped protrusions are disposed at predetermined intervals to guide a walking direction. A longitudinal direction of the rod-shaped protrusions indicates the walking direction.

In the warning block, 25 or more dot-shaped protrusions are disposed in a grid pattern to warn of a possibility of danger ahead and a need to change the walking direction.

When a visually impaired person relies on the Braille blocks to move, the Braille blocks allows the visually impaired person to know a movement direction, danger, notice of change in a walking direction, etc. However, it has not been possible to apprehend a place on which the Braille blocks are disposed and a place to which the visually impaired person is guided, which are intended content.

Patent Document 1 is a background technology in this technical field. Patent Document 1 describes a method in which an RFID tag is affixed to a Braille block, information stored in the RFID is received by a receiver installed on a white cane of a visually impaired person, and the information is notified by voice.

CITATION LIST

Patent Document

Patent Document 1: JP 2016-541065 A

SUMMARY OF THE INVENTION

Problems to be Solved by the Invention

In Patent Document 1, a walking direction of the visually impaired person with respect to the Braille block is known at the time of passing through two or more Braille blocks. However, the walking direction of the visually impaired person cannot be determined only by a single Braille block. In addition, the white cane requires a dedicated RFID receiver, which imposes an economic burden on the visually impaired person.

Therefore, an object of the invention is to provide a road guidance system capable of determining a walking direction of a visually impaired person using only a single Braille block and capable of executing road guidance using an inexpensive device, and a mobile information terminal used therefor.

Solutions to Problems

To solve the above problem, an example of the invention is a road guidance system including a mobile information terminal and a Braille block, in which the mobile information terminal includes a photographing processing unit, a QR code analysis processing unit that analyzes a QR code (registered trademark), a voice output processing unit, and a control unit, a QR code is affixed to the Braille block, and the control unit analyzes the QR code affixed to the Braille block photographed by the photographing processing unit using the QR code analysis processing unit to obtain QR code information, generates road guidance information generated based on a walking direction of a user holding the mobile information terminal from the QR code information, and outputs the road guidance information from the voice output processing unit as a voice.

Effects of the Invention

By using the technology of the invention, it is possible to easily intuitively understand front, back, left, and right guidance for the Braille block and reduce mistakes with regard to a walking direction.

BRIEF DESCRIPTION OF THE DRAWINGS

FIG. 1 is a schematic view of a warning block in a first embodiment.

FIG. 2 is an external view of a smartphone in the first embodiment.

MODE FOR CARRYING OUT THE INVENTION

Figure 3:
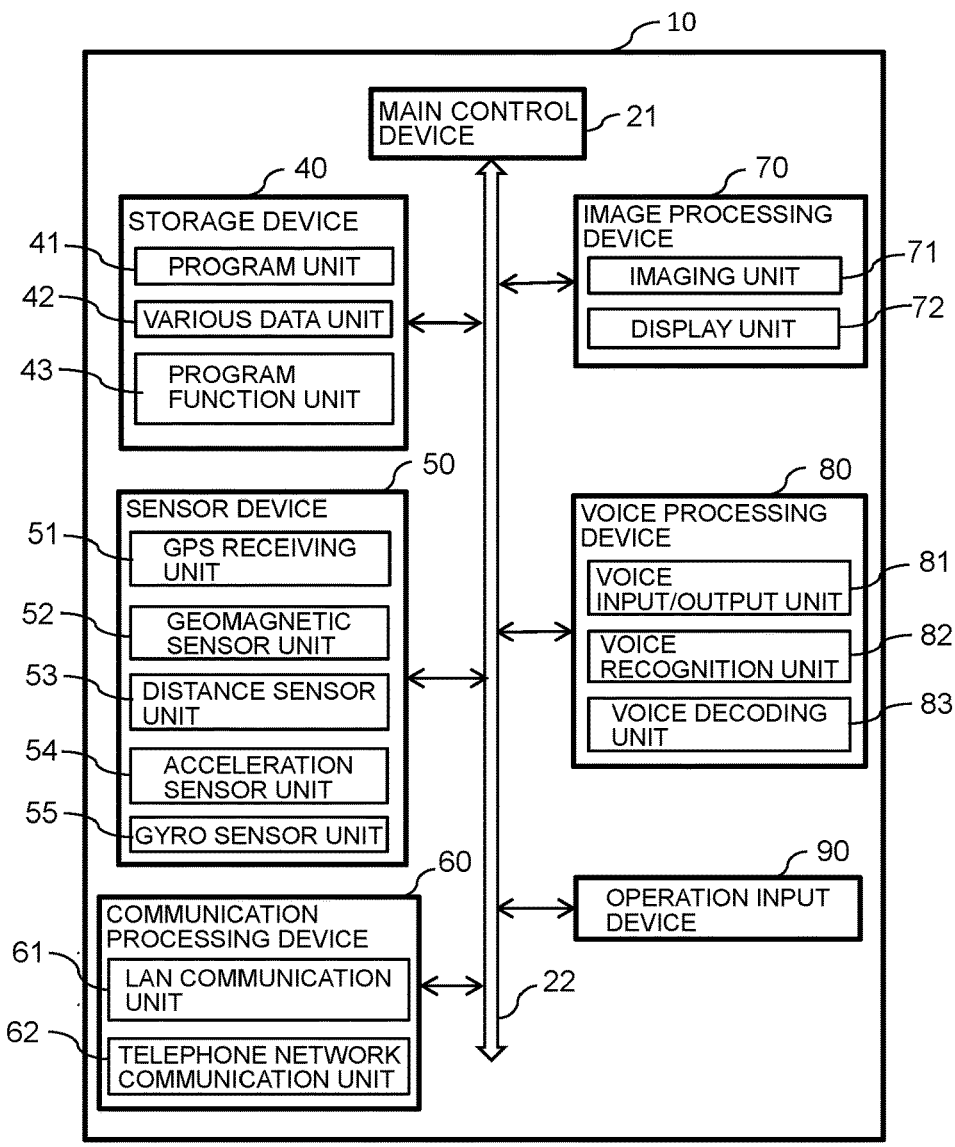
FIG. 3 is a hardware configuration diagram of a smartphone in the first embodiment.

Hereinafter, examples of the invention will be described with reference to the drawings. Note that even though the present embodiment is an invention mainly intended for visually impaired people, the present embodiment is also effective for pedestrians other than the visually impaired people.

First Embodiment

In the present embodiment, a QR code is affixed to a Braille block, and information stored in the QR code is associated with a walking direction of a visually impaired person, in other words, the information is converted and generated based on the walking direction and conveyed to the visually impaired person. In addition, using an existing mobile information terminal such as a smartphone reduces an increase in a financial burden on the visually impaired person.

Here, a QR code using a two-dimensional code can have information in vertical and horizontal directions as compared with a barcode having only information in a horizontal direction, and thus is generalized with the spread of smartphones, etc. This QR code has square cutout symbols (also referred to as a position detection pattern or a finder pattern) at three corners, and can detect a reference direction of the QR code. In addition, it is difficult for a visually impaired person to apprehend content of a display screen of a smartphone (mobile information terminal). However, it has been proven that the visually impaired person can use a smartphone function with support of voice output, etc. depending on the familiarity.

FIG. 1 is a schematic view of a warning block which is a Braille block in the present embodiment. In FIG. 1, in a 30 cm square warning block 1, 25 dot-shaped protrusions 2 (height 5 mm, bottom circle diameter 22 mm) are disposed in a grid shape with a center distance of 60 mm.

In addition, a 10 cm square QR code 3 is affixed to a center of the warning block 1. A circular notch having a diameter of 22 mm is prepared in a center of the QR code 3 so as not to hang on the dot-shaped protrusion 2, and can be used as a guide when the QR code is affixed.

Further, in the QR code 3, square cutout symbols (4, 5, and 6) are disposed at three corners. When the three cutout symbols (4, 5, and 6) are disposed, a reference direction of the QR code 3 affixed to the warning block 1 is determined. The reference direction of the QR code affixed to the warning block 1 of FIG. 1 is a direction in which the cutout symbol 5 is on the upper left. That is, a direction of the cutout symbol 5 from the cutout symbol 4 is a front direction, a direction of the cutout symbol 4 from the cutout symbol 5 is a back direction, a direction of the cutout symbol 6 from the cutout symbol 5 is a right direction, and a direction of the cutout symbol 5 from the cutout symbol 6 is a left direction.

The QR code 3 includes road guidance information related to front, back, left, and right with respect to the reference direction of the QR code. By photographing the QR code 3 using a mobile information terminal such as a smartphone, the QR code 3 can be analyzed and the road guidance information of the QR code 3 can be acquired.

By converting and generating the acquired road guidance information related to the reference direction of the QR code 3 into front, back, left, and right road guidance information based on the walking direction of the visually impaired person, and outputting voice from the mobile information terminal such as the smartphone, it is possible to provide road guidance to the visually impaired person.

In the present embodiment, an example in which the smartphone is applied as the mobile information terminal will be described. FIG. 2 illustrates an external view of the smartphone in the present embodiment.

In FIG. 2, a smartphone 10 has a smartphone front surface 13 having a display screen 11 including a touch panel and a front camera (also referred to as an in-camera) 12 for self-shooting, a smartphone back surface 15 having a rear camera (also referred to as an out-camera or simply a camera) 14, and smartphone side surfaces.

An earphone microphone terminal (not illustrated) is provided on a side surface (right side surface in FIG. 2) in a certain direction of the front camera 12 on the front surface of the smartphone 10, an external connection terminal (not illustrated) is provided on a side surface (left side surface in FIG. 2) in an opposite direction from the front camera 12 on the front surface of the smartphone 10, a power key or a volume key (not illustrated) is provided on a right side surface (lower side surface in FIG. 2) with respect to a direction in which the front camera 12 is located on the front surface of the smartphone 10, and a card tray portion (not illustrated) is provided on the left side surface (upper side surface in FIG. 2) with respect to the direction in which the front camera 12 is located on front surface of the smartphone 10.

When the QR code 3 of the warning block 1 is photographed using the rear camera 14 of the smartphone 10 with the smartphone 10 facing down, as illustrated in FIG. 2, the QR code of the warning block 1 is displayed on the display screen of the smartphone 10. The photographed QR code 3 is analyzed by a QR code reading application built in the smartphone 10 as standard.

The present embodiment implements a QR code road guidance application (hereinafter, referred to as "road guidance system") linked with the QR code reading application.

FIG. 3 is a hardware configuration diagram of the smartphone in the present embodiment. In FIG. 3, the smartphone 10 includes a main control device 21, a system bus 22, a storage device 40, a sensor device 50, a communication processing device 60, an image processing device 70, a voice processing device 80, and an operation input device 90.

The main control device 21 is a microprocessor unit that controls the entire smartphone 10 according to a predetermined operation program such as an application.

The system bus 22 is a data communication path for transmitting and receiving various commands and data between the main control device 21 and each constituent block in the smartphone 10.

The storage device 40 includes a program unit 41 that stores a program for controlling the operation of the smartphone 10, a various data unit 42 that stores various data such as operation setting values, detection values from a sensor device described later, and objects including content, and a rewritable program function unit 43 such as a work area used for various program operations. Further, the storage device 40 can store an operation program downloaded from a network, various data created by the operation program, etc. In addition, it is possible to store content such as a moving image, a still image, and sound downloaded from the network. In addition, it is possible to store data such as a moving image and a still image taken by using a camera unit. Further, the storage device 40 needs to hold stored information even when the smartphone 10 is not supplied with power from the outside. Therefore, for example, a device such as a semiconductor device memory such as an SSD (Solid State Drive) or a flash ROM is used. Note that each operation program stored in the storage device 40 can be updated and partially extended by a download process from each server device on the network.

The sensor device 50 is a sensor group of various sensors for detecting the state of the smartphone 10. The sensor device 50 includes a GPS (Global Positioning System) receiving unit 51, a geomagnetic sensor device 52, a distance sensor device 53, an acceleration sensor device 54, and a gyro sensor device 55. With these sensor groups, it is possible to detect a position, a tilt, a direction, movement, a movement direction, etc. of the smartphone 10. Further, the smartphone 10 may further include other sensors such as an illuminance sensor and a proximity sensor. Furthermore, when a device paired with these sensors is affixed to a hand or an arm, movement of the hand or the arm can be detected. By comprehensively utilizing these sensor groups, it is possible to detect the walking direction of the user holding the smartphone 10, the tilt and direction of the smartphone 10, etc.

The communication processing device 60 includes a LAN (Local Area Network) communication unit 61 and a telephone network communication unit 62.

The LAN communication unit 61 is connected to a network such as the Internet via an access point, etc., and transmits/receives data to/from each server device on the network. Connection with the access point, etc. may be made by wireless connection such as Wi-Fi (registered trademark).

The telephone network communication unit 62 performs telephone communication (call) and data transmission/reception by wireless communication with a base station, etc. of a mobile telephone communication network. Communication with the base station, etc. may be performed by a W-CDMA (Wideband Code Division Multiple Access) (registered trademark) method, a GSM (Global System for Mobile communications) (registered trademark) method, an LTE (Long Term Evolution) method, or other communication methods. Each of the LAN communication unit 61 and the telephone network communication unit 62 includes a coding circuit, a decoding circuit, an antenna, etc. Further, the communication processing device 60 may further include other communication units such as a Bluetooth (registered trademark) communication unit and an infrared communication unit.

The image processing device 70 includes an imaging unit 71 and a display unit 72. The imaging unit 71 is a camera unit that inputs image data of an object such as a surrounding or a QR code by converting light input from a lens into an electric signal using an electronic device such as a CCD (Charge Coupled Device) or a CMOS (Complementary Metal Oxide Semiconductor). The display unit 72 is, for example, a display device such as a liquid crystal panel, and provides image data to a user of the smartphone 10. The display unit 72 includes a video RAM (not illustrated). Display on the display screen is performed based on the image data input to the video RAM. The QR code is photographed by the imaging unit 71.

The voice processing device 80 includes a voice input/output unit 81, a voice recognition unit 82, and a voice decoding unit 83. The voice input of the voice input/output unit 81 is a microphone, and voice of the user, etc. is converted into voice data and input. Further, the voice output of the voice input/output unit 81 is a speaker or earphones, and voice information, etc. necessary for the user is output. The voice recognition unit 82 analyzes the input voice information and extracts an instruction command, etc. The voice decoding unit 83 has a function of performing decoding processing (voice synthesis processing) on a coded voice signal, etc., if necessary.

The operation input device 90 is an instruction input unit for inputting an operation instruction to the smartphone 10. The operation input device 9 includes a touch panel on a display screen, operation keys in which button switches, etc. are arranged, etc. Other operating devices may be further provided. The smartphone 10 may be operated by using the communication processing device 60 and using a separate mobile terminal device connected by wired communication or wireless communication. Further, the smartphone 10 may be operated by a voice command of the operation instruction using the voice recognition unit 82 of the voice processing device 80.

Note that a configuration example of the smartphone 10 illustrated in FIG. 3 includes many configurations that are not essential to the present embodiment. However, even when these configurations are not provided, the effect of the present embodiment is not impaired. Further, configurations (not illustrated) such as a digital broadcast receiving unit and an electronic money payment unit may be further added.

Figure 4:
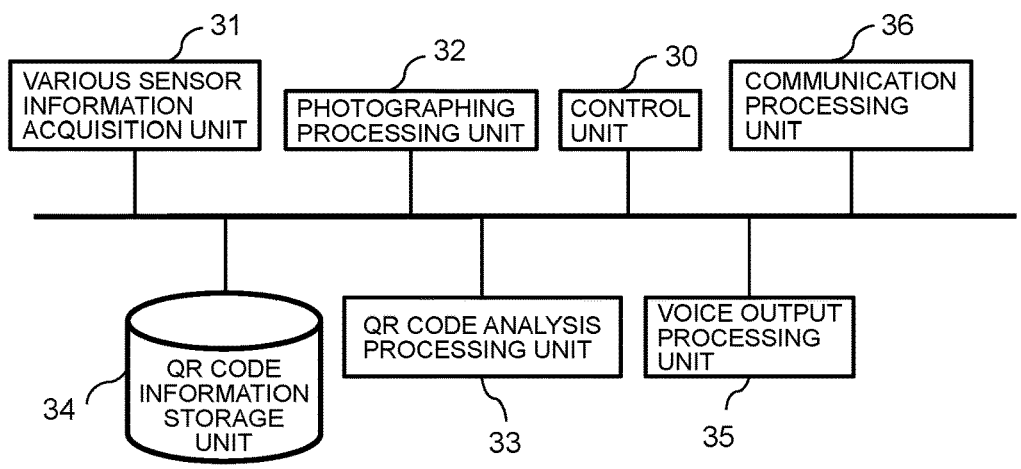
FIG. 4 is a functional block configuration diagram of the smartphone in the first embodiment.

FIG. 4 is a functional block configuration diagram of the smartphone in the present embodiment. In FIG. 4, a control unit 30 mainly includes a main control device 21, and a program unit 41 and a program function unit 43 of the storage device 40. The control unit 30 executes an application of the road guidance system of the present embodiment.

A various sensor information acquisition unit 31 has a function of acquiring information from various sensors of the sensor device 50, and apprehend the tilt and walking direction of the smartphone 10.

The photographing processing unit 32 has a function of photographing a QR code by the imaging unit 71 of the image processing device 70. The photographed QR code is analyzed by a QR code analysis processing unit 33, and information stored in the QR code is extracted.

The QR code information storage unit 34 has a function of storing the extracted QR code information in the various data unit 42 of the storage device 40.

A voice output processing unit 35 has a function of outputting voice assisting photographing and voice of content of QR code information in consideration of the walking direction of the user using the speaker or earphones of the voice input/output unit 81.

A communication processing unit 36 mainly includes the LAN communication unit 61 of the communication processing device 60, and has a function of uploading various types of information of the smartphone 10 to an external network server via an Internet network or downloading various types of information from the external network server via the Internet network.

The road guidance system in the present embodiment is a system that associates QR code information obtained by the QR code analysis processing unit 33 with a walking direction of a smartphone owner obtained by the various sensor information acquisition unit 31 to determine voice to be output, and outputs the voice through a speaker or earphones by the voice output processing unit 35. Naturally, it is possible to display text information on the display screen without voice output.

Here, a procedure in which the visually impaired person photographs a QR code using the smartphone, acquires QR code information, and receives voice guidance will be described with reference to a flowchart of FIG. 5.

The visually impaired person finds a position of the Braille block using a feel of a stepped foot and the white cane. The Braille block includes a guidance block that assists the walking direction and a warning block that warns of the possibility of danger ahead and the need to change the walking direction.

When it is determined that the Braille block is the guidance block, the visually impaired person walks along the longitudinal direction of the rod-shaped protrusion existing on the guidance block.

Figure 5:
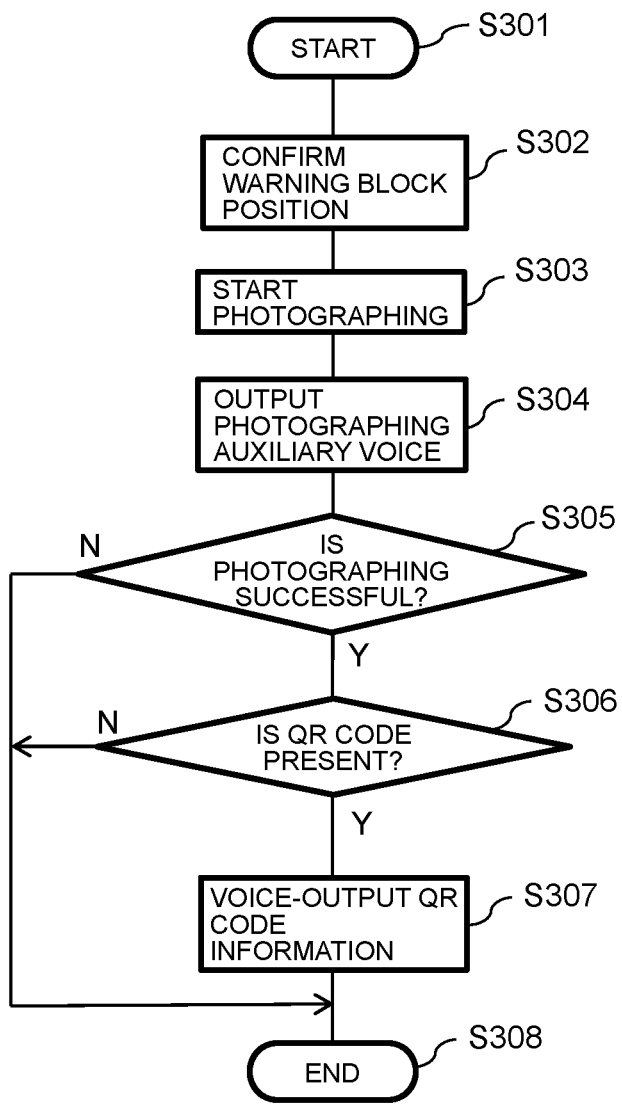
FIG. 5 is a flowchart illustrating a processing procedure of the road guidance system in the first embodiment.

The flowchart of FIG. 5 is a flowchart illustrating a procedure from the time when the visually impaired person determines that the Braille block is the warning block to acquisition of QR code information and guidance by voice.

In FIG. 5, when the QR code processing procedure is started (S301), the visually impaired person first confirms the position of the warning block by touch of the white cane (S302).

Next, the visually impaired person verifies whether the smartphone is face up or face down by touch of a hand, points the rear camera on the back surface of the smartphone toward the warning block, and starts a photographing operation using the photographing processing unit 32 (S303). Naturally, depending on the application, it is possible to perform photographing using the front camera on the front surface of the smartphone. An instruction to start photographing is given by a voice command such as "photographing" or "camera". A photographing state by this smartphone continues until the photographing is normally completed or a photographing stop instruction is issued.

Photographing auxiliary voice that changes the tile of the smartphone or a distance to the QR code is output as necessary by the voice output processing unit 35 so that the QR code can be normally recognized by the tile of the smartphone, the distance from the smartphone to the QR code of the warning block, etc (S304). For example, a photographing auxiliary voice such as "move the camera closer to the warning block", "move a little further forward", or "tilt a little further forward" is output. The visually impaired person corrects a posture of the smartphone, etc. based on a voice output of the photographing auxiliary voice. Naturally, if unnecessary, the voice output of the photographing auxiliary voice is not performed.

Next, whether or not the photographing is successful is determined by a voice output such as "photographing is successful" or "photographing is not possible" (S305). When the QR code is not normally photographed within a predetermined time-out time, it is determined that the photographing is not successful. The voice output "photographing is successful" can be omitted since shutter sound can be used instead.

When the application determines that the photographing could not be performed normally in the processing of S305, the processing procedure is terminated (S308).

When the application determines that the photographing is successful in the processing of S305, the QR code analysis processing unit 33 determines the presence or absence of the QR code (S306). When the QR code could not be recognized normally, it is determined that the QR code does not exist.

Note that when it is determined that the QR code does not exist, the presence or absence of the QR code is output by voice. For example, voice output is "there is no information" or "information is acquired". The voice output of "information is acquired" can be omitted.

When it is determined in S306 that the QR code does not exist, the processing procedure of the road guidance system is terminated (S308).

When it is determined in S306 that the QR code exists, the QR code analysis processing unit 33 of the smartphone determines the reference direction of the warning block 1 by disposing three cutout symbols, then analyzes content of the QR code, stores the information in the QR code information storage unit 34, and then outputs the information as voice by the voice output processing unit 35 (S307).

When the warning block is reached without passing through the guidance block, the reference direction of the QR code and the walking direction may not coincide with each other. The case where the reference direction of the QR code and the walking direction are 0 degrees, 90 degrees to the right, 180 degrees to the right, and 90 degrees to the left is dealt with by reading front, back, left, and right information. For other angles, a voice instruction is issued to change the walking direction to any of 0 degrees, 90 degrees to the right, 180 degrees to the right, and 90 degrees to the left, or voice output is performed by the voice output processing unit 35 using voice obtained by correcting an angle between the walking direction and the reference direction of the warning block. Thereafter, the processing procedure of the road guidance system is completed (S308).

Next, QR code information output as voice by the voice output processing unit 35 will be described using an example of the warning block of FIG. 1.

The reference direction of the QR code affixed to the warning block 1 of FIG. 1 is a direction in which the cutout symbol 5 is on the upper left. Further, the QR code 3 includes information related to front, back, left and right with respect to the reference direction of the QR code. For example, information such as a down staircase 5 m in front, a branch 20 m behind, an elevator 10 m to the right, and a platform on track 3 15 m to the left is included. In addition, each QR code includes distance information to a Braille block in which a next QR code exists in a direction thereof (hereinafter, the Braille block in which the QR code exists is referred to as a "QR code Braille block").

The walking direction of the visually impaired person holding the smartphone 10 is determined by the various sensor information acquisition unit 31 of the smartphone 10.

The QR code information is output as voice by the voice output processing unit 35 based on the walking direction of the visually impaired person. For example, when the walking direction of the visually impaired person is the reference direction of the QR code (which indicates a direction from a bottom to a top in FIG. 1), voice outputs by the voice output processing unit 35 based on the walking direction of the visually impaired person to be output are "there is a down staircase 5 m ahead, it is 2 m to the next QR code Braille block", "there is a sidewalk branch 20 m behind, it is 10 m to the next QR code Braille block", "there is an elevator 10 m to the right, it is 5 m to the next QR code Braille block", and "there is a platform on track 3 15 m to the left, it is 7 m to the next QR code Braille block".

Further, for example, when the walking direction of the visually impaired person is a walking direction from right to left with respect to the reference direction of the QR code, voice outputs based on the walking direction of the visually impaired person are "there is a down staircase 5 m to the right, it is 3 m to the next QR code Braille block", "there is a sidewalk branch 20 m to the left, it is 10 m to the next QR code Braille block", "there is an elevator 10 m behind, it is m to the next QR code Braille block", and "there is a platform on track 3 15 m ahead, it is 7 m to the next QR code Braille block".

Further, it is possible to provide voice guidance by associating a characteristic portion of the smartphone 10 with the walking direction without depending on the walking direction. For example, when the front surface of the smartphone 10 is face up and a direction side of the front camera 12, which is a longitudinal direction, is the right direction, with regard to the front, back, left, and right directions, the front direction may be replaced with a direction in which the card tray portion is located, the right direction may be replaced with a direction in which the earphone microphone terminal is located, the back direction may be replaced with a direction in which the power key is located, and the left direction may be replaced with a direction in which the external connection terminal is located.

As described above, the road guidance system of the present embodiment has an effect that the visually impaired person is intuitive and easy to understand since the road guidance based on the walking direction is output by voice. In addition, there is an advantage that road guidance can be provided even when there is only one warning block.

In addition, the method of the present embodiment can be applied to a healthy person other than the visually impaired person. In the case of applying to the healthy person or a hearing-impaired person, the road guidance based on the walking direction is displayed on the display screen as a figure such as an arrow indicating the movement direction or a text sentence without voice output. Naturally, in the case of the healthy person, voice output can be used together.

In addition, to use the road guidance system of the present embodiment, it is desirable that the user using the smartphone designates identification of a visually impaired person, a hearing-impaired person, a healthy person, etc. on the smartphone in advance, and tunes a smartphone application for each user.

As described above, in the present embodiment, a QR code is affixed to an existing Braille block, the QR code is photographed by an existing mobile information terminal such as a smartphone, and information stored in the QR code is associated with a walking direction of a user and output as voice. In this way, the user can intuitively understand the front, back, left, and right guidance, and can reduce mistakes with regard to the walking direction. Further, since the walking direction of the user can be determined only by a single Braille block and the determination can be carried out only by a general-purpose mobile information terminal, it is possible to provide a road guidance system capable of executing road guidance with an inexpensive device.

Second Embodiment

In the first embodiment, the case where there is one warning block is assumed. However, in the present embodiment, dealing with the case where a plurality of warning blocks exists will be described.

Figure 6:
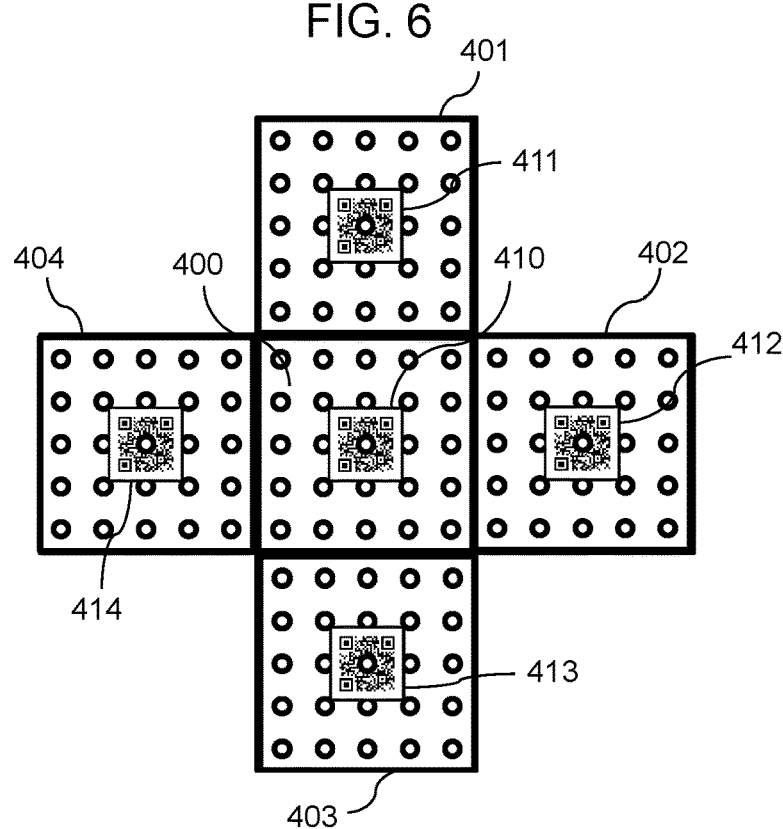
FIG. 6 is a layout diagram of warning blocks in a second embodiment.

FIG. 6 is a layout diagram of warning blocks in the present embodiment. As illustrated in FIG. 6, five warning blocks are disposed, and a QR code is affixed to each warning block. In FIG. 6, reference directions of QR codes are all the same.

A warning block 400 is disposed in the center, a warning block 401 is disposed in an upward direction of the reference direction, a warning block 402 is disposed in a right direction of the reference direction, a warning block 403 is disposed in a downward direction of the reference direction, a warning block 404 is disposed in a left direction of the reference direction, and QR codes (410, 411, 412, 413, and 414) are affixed to the respective warning blocks.

Each of the QR codes stores information related to arrangement of five warning blocks. That is, information related to a center is stored in the QR code 410, information related to a top is stored in the QR code 411, information related to a right is stored in the QR code 412, information related to a bottom is stored in the QR code 413, and information related to a left is stored in the QR code 414.

A QR code processing procedure is the same as that of the flowchart of FIG. 5 illustrated in the first embodiment. However, an output voice output is different depending on the detected warning block.

The visually impaired person reaches the warning block existing in the walking direction along the guidance block.

When the walking direction is a direction from the bottom to the top in FIG. 6, a warning block reached first is the warning block 403 existing in the downward direction of the warning block 400 in the center.

The block is a warning block in front, and thus, for example, a voice such as "this is the warning block in front", "there is a down staircase 5 m ahead", or "there is a branch of the sidewalk 20 m behind" is voice-output from information stored in the QR code 413 affixed to the warning block 403.

When the next warning block 400 is reached along the walking direction, since the block is the warning block in the center, for example, a voice such as "this is the warning block in the center", "there is a down staircase 5 m ahead", "there is a sidewalk branch 20 m behind", "there is an elevator 10 m to the right", or "there is a platform on track 3 15 m to the left", is voice-output from information stored in the QR code 410 affixed to the warning block 400.

For example, in the case of desiring to going to platform on track 3, the walking direction is changed to the left at the position of the warning block 400, and the next warning block 404 existing in the left direction of the warning block 400 in the center is detected. Since the walking direction is the left direction from the right, the block is a warning block in front of the visually impaired person. Thus, from information stored in the QR code 414 affixed to the warning block 404, a voice such as "this is a warning block in front", "there is a platform on track 3 15 m ahead", or "there is an elevator 10 m behind" is voice-output. Since the walking direction is fixed, it is possible to omit a voice output of "there is an elevator 10 m behind".

As described above, there is an effect that the visually impaired person is intuitive and easy to understand since the road guidance based on the walking direction is output by voice. In addition, there is an advantage that the walking direction can be reliably confirmed since a plurality of warning blocks exists.

In addition, the method of the present embodiment can be applied to people other than the visually impaired person. When applied to the hearing-impaired person and the healthy person other than the visually impaired person, it is possible to display road guidance based on the walking direction as a sentence on the display screen without voice output. Naturally, in the case of the hearing-impaired person or the healthy person other than the visually impaired person, the purpose can be achieved only by information stored in the QR code 410 affixed to the warning block 400 in the center.

Third Embodiment

In the second embodiment, all the reference directions of the QR codes affixed to the five warning blocks are the same. However, in the present embodiment, a description will be given of the case where the reference directions of the QR codes are different.

Figure 7:
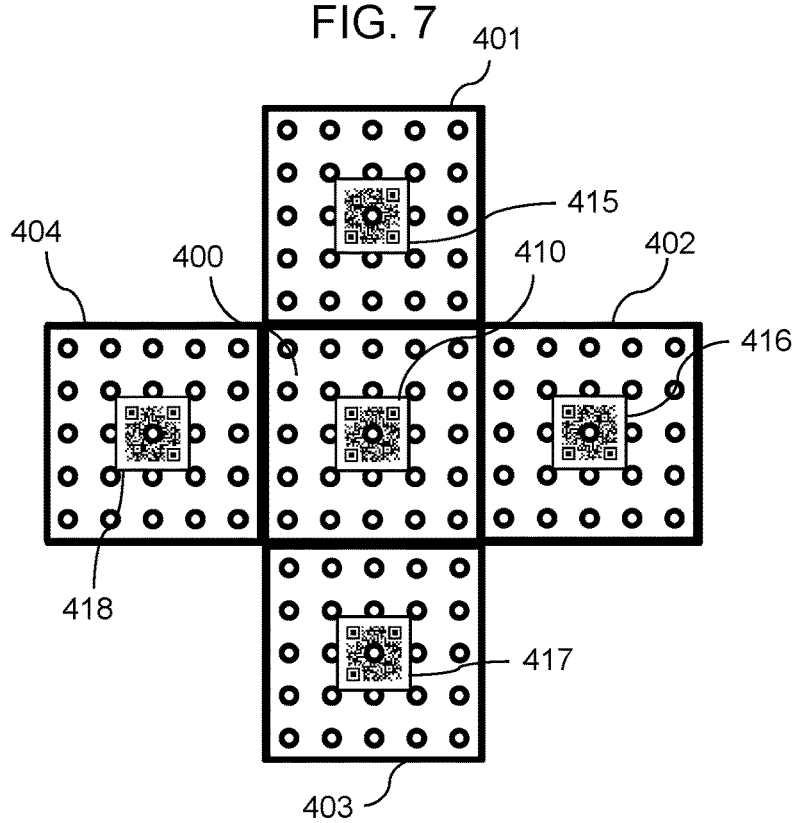
FIG. 7 is a layout diagram of warning blocks in a third embodiment.

FIG. 7 is a layout diagram of warning blocks having different reference directions of QR codes affixed to warning blocks in the present embodiment. In FIG. 7, with respect to a warning block 400 in a center, all reference directions of QR codes 415, 416, 417, and 418 affixed to front, back, left, and right warning blocks 401, 402, 403, and 404 are directions of the warning block 400 in the center.

Even in such a case, since information related to arrangement of the five warning blocks is stored in each QR code, the same effects and advantages as in the second embodiment can be obtained without depending on the reference direction of the QR code.

Fourth Embodiment

In the second and third embodiments, it is assumed that branches of a walking passage include the four front, back, left, and right directions (each direction is different by 90 degrees) including the walking direction. However, in the present embodiment, a description will be given of a point that the invention can be applied to different branches of the front, back, left, and right.

Figure 8:
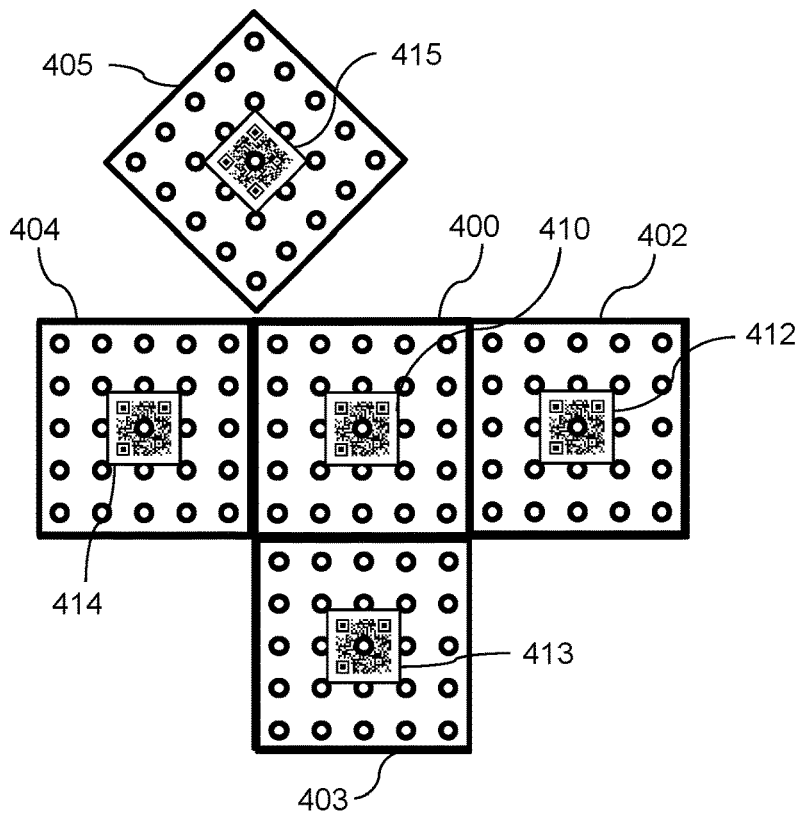
FIG. 8 is a layout diagram of warning blocks in a fourth embodiment.

FIG. 8 is a layout diagram of warning blocks when there is no sidewalk ahead in a straight-ahead direction and there is a sidewalk in a left 45-degree direction. As illustrated in FIG. 8, there is no warning block in front of the warning block 400 in the center, and the warning block 405 is disposed in a direction of 45 degrees forward to the left from the reference direction of the warning block 400 in the center.

The QR code 415 of the warning block 405 stores information indicating a tilt in a left 45-degree direction forward from the reference direction of the warning block 400. Instead of expressing "forward" in the above-described embodiment, an expression "left 45-degree direction forward" is used in the present embodiment. Further, at the position of the warning block 405 (the position of the QR code 415), an expression "a warning block in a left 45-degree direction" is used. Further, in the QR code 415 of the warning block 405, with reference to the reference direction of the warning block 400 in the center, the right direction is replaced with and expressed as a right 135-degree direction, the left direction is replaced with and expressed as a left 45-degree direction, and the back is replaced with and expressed as 135 degrees to the left.

According to the present embodiment, the visually impaired person can recognize the existence of the warning block in the left 45-degree direction in advance, so that an anxiety state for an unknown branch can be eliminated.

Naturally, since the hearing-impaired person or the healthy person other than the visually impaired person merely finds the guidance block to which the QR code is affixed, it is relatively easy to obtain QR code information for the next warning block.

Fifth Embodiment

The first embodiment does not mention a relationship between the reference direction of the QR code affixed to the warning block and the absolute direction of north, south, east, and west. However, in the present embodiment, a description will be given of the case where the reference direction of the QR code affixed to the warning block coincides with the absolute direction of north, south, east, and west.

Figure 9:
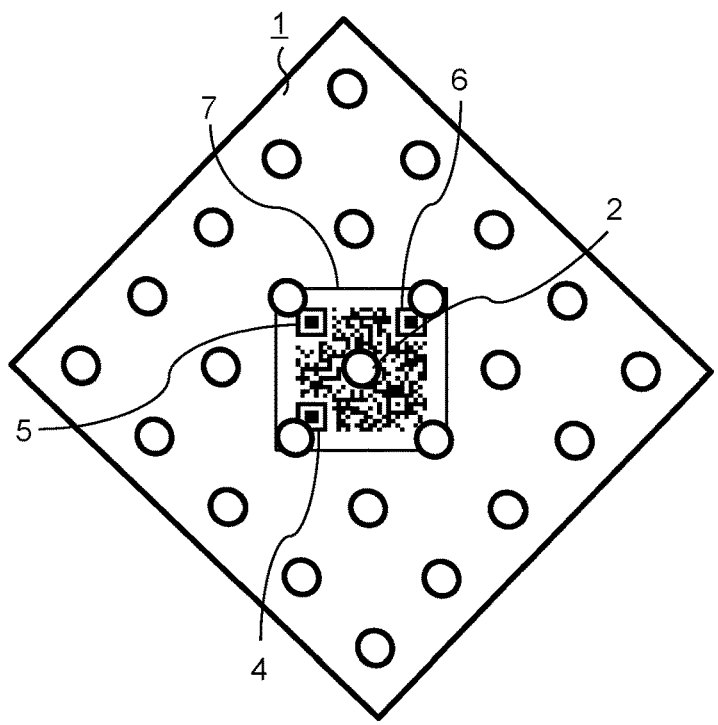
FIG. 9 is a layout diagram of a warning block in a fifth embodiment.

FIG. 9 is a schematic view illustrating an example in which the reference direction of a QR code 7 affixed to a warning block 1 in the present embodiment coincides with the absolute directions of north, south, east, and west.

The QR code 7 in this case includes information about a deviation angle of the warning block 1 from the absolute direction of north, south, east, and west. FIG. 9 illustrates the case where an upper part of the figure is the north direction and the reference direction of the QR code 7 coincides with the north direction, and illustrates an example of the case where the warning block 1 is tilted 45 degrees to the left as a result. Therefore, in the case of FIG. 9, the QR code 7 stores information indicating that the warning block 1 is tilted 45 degrees to the left. Therefore, in order to perform conversion into front, back, left, and right information for a visually impaired person walking along the guidance block, it is necessary to convert all the information stored in the QR code 7 into information tilted 45 degrees to the left. That is, a direction of the QR code 7 of 45 degrees to the left is forward, a direction of the QR code 7 of 45 degrees to the right is the right direction, a direction of the QR code 7 of 135 degrees to the right is backward, and a direction of the QR code 7 of 135 degrees to the left is the left direction.

In this way, for the visually impaired person, it is possible to obtain the same effect or advantage as that in the first embodiment described above.

For the hearing-impaired person or the healthy person other than the visually impaired person, displaying the information about the absolute direction of the QR code on the display screen has an effect of matching an image with a map and making it easier to understand.

Sixth Embodiment

In the first to fifth embodiments, the warning block has been described. However, the present embodiment describes an example using a guidance block.

Figure 10:
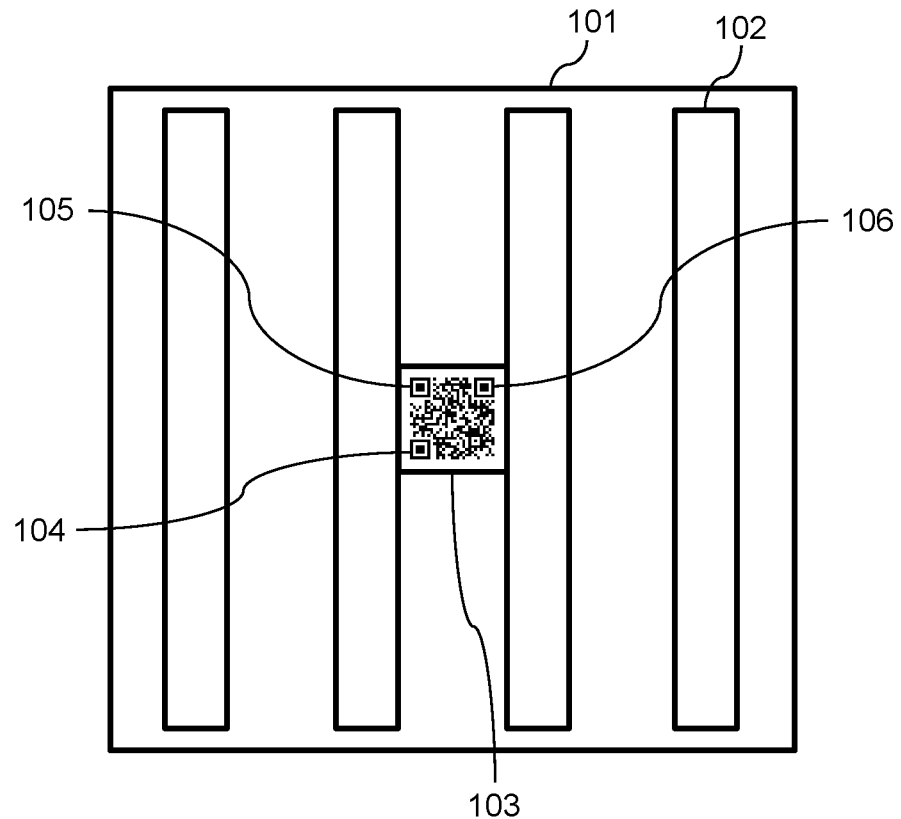
FIG. 10 is a layout diagram of a warning block in a sixth embodiment.

FIG. 10 is a schematic view of the guidance block in the present embodiment. In FIG. 10, four rod-shaped protrusions (height 5 mm, bottom width 27 mm, and length 280 mm in the longitudinal direction) 102 are disposed on a 30 cm square guidance block 101 with a center distance of 75 mm.

The QR code 103 is affixed to a center of the guidance block 101, and a size thereof is 37.5 mm square that fits between the rod-shaped protrusions 120.

Square cutout symbols 104, 105, and 106 are disposed at three corners in the QR code 103. A reference direction of the guidance block 101 is determined by arrangement of the three cutout symbols 104, 105, and 106. That is, a direction from the cutout symbol 104 to the cutout symbol 105 (longitudinal direction of the rod-shaped protrusion) is a guidance direction of the guidance block.

The QR code 103 includes information related to the front and back with respect to the QR code reference direction. For example, information such as a down staircase 5 m in front and a branch 20 m behind is included.

It is desirable to affix QR codes to all guidance blocks. However, for example, when four guidance blocks to which QR codes are affixed continue (120 cm), this case can be dealt with by affixing a QR code to a next guidance block. That is, QR code information can be acquired every 150 cm. A visually impaired person traces up to five guidance blocks to reach the guidance block to which the QR code is affixed. Thereafter, four guidance blocks can be skipped, and QR code information can be acquired in a next guidance block.

Since the hearing-impaired person or the healthy person other than the visually impaired person merely finds the guidance block to which the QR code is affixed, QR code information can be obtained relatively easily.

Seventh Embodiment

In the first embodiment, the road guidance system is constructed by the smartphone alone. However, in the present embodiment, a description will be given of a method of further improving the effect using external information.

Figure 11:
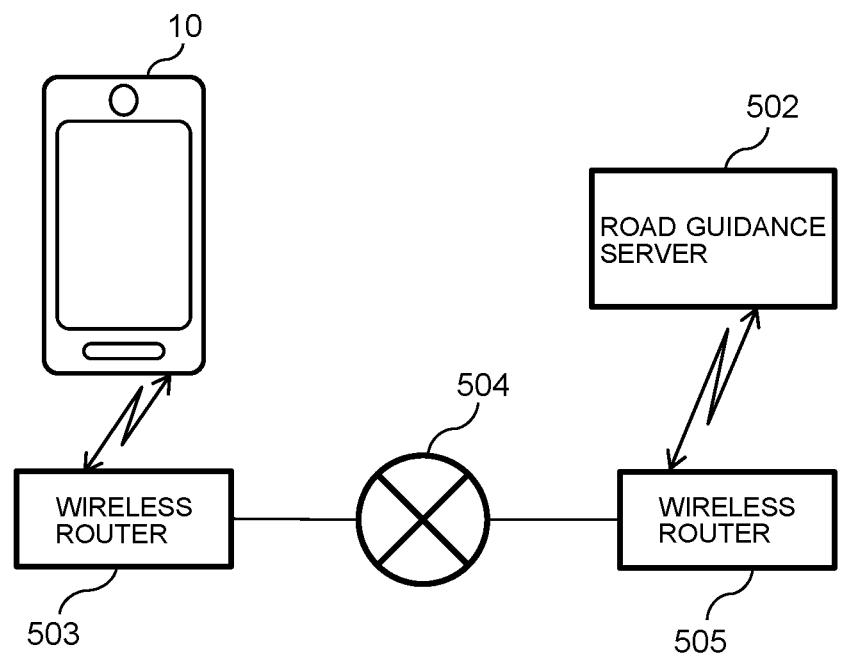
FIG. 11 is a system configuration diagram in a seventh embodiment.

FIG. 11 is a system configuration diagram in which the smartphone 10 and a road guidance server 502 that manages road guidance information are connected to each other via a wireless router 503, a network 504, and a wireless router 505.

An owner of the smartphone 10 receives road guidance using information of the road guidance server 502.

The road guidance server 502 stores map information, facility information (including information indicating positions of toilets, stairs, elevators, etc.), Braille block arrangement information, etc. Effective examples include, for example, ticket gate and exit information in a station yard, store layout information in a shopping mall, etc.

The visually impaired person needs to confirm in advance that information on a place to be used (a station name, a facility name of a shopping mall, etc.) exists on the road guidance server 502, and downloads the necessary information.

By storing absolute position information (latitude, longitude, etc.) of the QR code, unique identification information (number) for individually identifying the Braille block, link information of the road guidance server 502, etc. in the QR code affixed to the Braille block, it is possible to improve consistency with the information of the road guidance server 502. In addition, it is possible to store link information other than the link information of the road guidance server 502 for obtaining necessary information via the network 504.

It is desirable that the visually impaired person downloads the information of the road guidance server 502 related to the place to be used to the smartphone 10 in advance.

Figure 12:
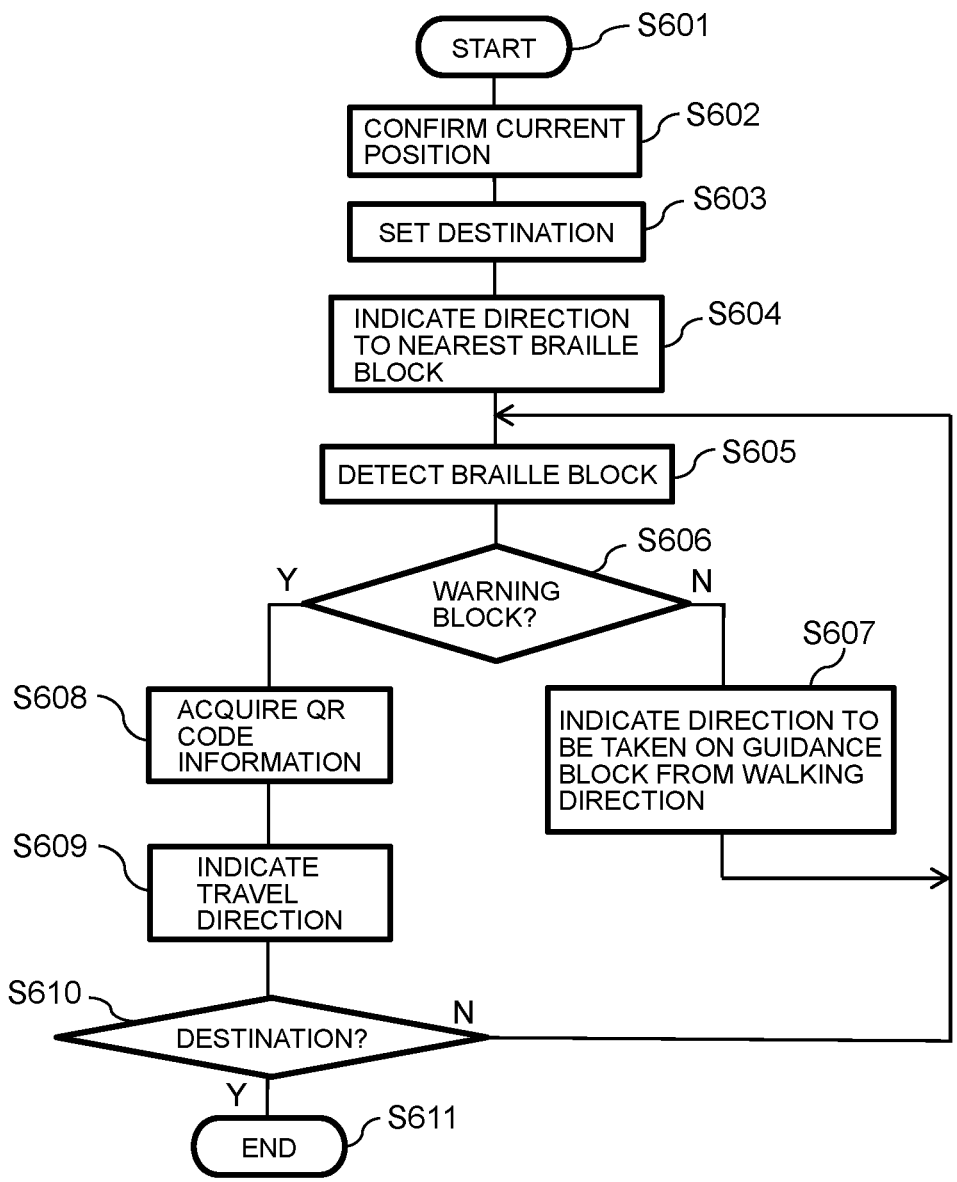
FIG. 12 is a flowchart illustrating a processing procedure of a road guidance system in the seventh embodiment.

FIG. 12 is a flowchart illustrating a procedure until reaching a destination desired by the visually impaired person using the road guidance information stored in the road guidance server 502 in the present embodiment.

In FIG. 12, when the road guidance system using the road guidance information stored in the road guidance server 502 is started (S601), the visually impaired person first confirms a current position of the visually impaired person by the various sensor information acquisition unit 31 of the smartphone 10 (S602).

A position of the smartphone 10 on a plane is detected by the GPS receiving unit 51 of the sensor device 50. By receiving radio waves from a plurality of GPS satellites, it is possible to detect position coordinates (latitude and longitude) of the smartphone 10. In addition to the GPS information from the GPS satellites, location information can be acquired using information transmitted from Wi-Fi, Bluetooth, and mobile base stations. Thus, when GPS information cannot be acquired, position information of the smartphone 10 is acquired by the information. Naturally, it is possible to combine such information including the GPS information. In the road guidance system of the present embodiment, when the position information from the GPS information or other information cannot be acquired, information from the acceleration sensor device 54, the gyro sensor device 55, etc. of the sensor device 50 is used for supplementation. Then, when the position information from the GPS information or other information can be acquired at some point during walking, this case can be dealt with by correction.

Next, a destination is set on the smartphone 10 (S603). The destination is set by inputting a voice of the destination from a microphone of the voice input/output unit 81 of the voice processing device 80 and recognizing the destination by the voice recognition unit 82. When the corresponding destination is not found in the road guidance server 502, the voice output processing unit 35 voice-outputs a voice of "the desired destination cannot be found, please set another destination". It is desirable to register destinations frequently used by the visually impaired person in the road guidance server 502 in advance.

When the destination is set in the smartphone 10 by the processing of S603, necessary road information from the road guidance server 502 to the destination is downloaded to the smartphone 10. Thereafter, the information of the road guidance server 502 stored in the smartphone 10 is used.

Naturally, when the information of the road guidance server 502 related to the place to be used is downloaded to the smartphone 10 in advance, the necessary road information to the destination can be generated by n application of the smartphone 10.

Next, a Braille block at a position closest to a current position of the smartphone 10 is identified by an application from current position information of the smartphone 10 and the Braille block arrangement information obtained by the communication processing unit 36 from the road guidance server 502, and the voice output processing unit 35 provides voice guidance on a distance from the current position of the smartphone 10 and the walking direction (S604).

Next, the visually impaired person searches for the distance from the current position of the smartphone 10 and the walking direction, or the vicinity thereof, as instructed by the application of the smartphone 10, by the touch of the white cane, and detects the presence of the Braille block (S605).

Next, whether or not the Braille block detected in the processing of S605 is a warning block is determined by the touch of the white cane of the visually impaired person (S606).

When it is determined in the processing of S606 that the detected Braille block is not a warning block, this means that the detected Braille block is a guidance block. At the time of detecting this guidance block, detecting of the guidance block is input to the smartphone 10 by a voice, a button, etc., a walking direction to be taken is indicated by an angle between the walking direction of the smartphone 10 and the guidance direction (longitudinal direction) of the guidance block from the Braille block arrangement information obtained from the road guidance server 502 (S607). Thereafter, the processing returns to a Braille block search process of S605.

Note that in the guidance block, since the longitudinal direction of the rod-shaped protrusion is the guidance direction of the guidance block, the walking direction is known, and it is considered that that is no practical problem even when the Braille block having the QR code is not searched until the warning block is detected. In addition, it is unnecessary to input detecting of the guidance block to the smartphone 10 by a voice, a button, etc. Naturally, during this time, an instruction of the walking direction to be taken (processing of S607) does not occur.

When it is determined in the processing of S606 that the detected Braille block is a warning block, for confirmation, in the procedure described in the flowchart of FIG. 5, the QR code is photographed by the photographing processing unit 32, information stored in the QR code is analyzed by the QR code analysis processing unit 33, and QR code information is acquired (S608). In this case, consistency between the acquired QR code position information and the Braille block arrangement information stored in the smartphone is attempted, and physical position information of the smartphone can be corrected, which means that in all QR code Braille blocks, the physical position information of the smartphone can be corrected by the position information of each QR code. Note that the acquired information is stored by the QR code information storage unit 34.

Next, from the acquired QR code information, a warning block is identified and a travel direction instruction is obtained (S609). That is, the application of the smartphone 10 issues a voice instruction on the walking direction to be taken by the voice output processing unit 35.

Here, content of the voice output of the voice of the road guidance by the voice output processing unit 35 differs depending on the position of the detected warning block in the front-back, left-right, or center with respect to the walking direction. For example, assuming that walking progress walking for reaching the destination is on the left side of the reference direction of the QR code and the walking direction to reach the warning block coincides with the reference direction of the QR code, a voice by the voice output processing unit 35 is output as follows.

(1) When a detected warning block position is in front of the warning block in the center, the output voice is "proceed in the left direction via the next warning block in front, 10 m is left until the next QR code Braille block".

(2) When the detected warning block position is the warning block in the center, the output voice is "process in the direction of the next warning block on the left, 5 m is left until the next QR code Braille block".

When the detected warning block position is on the left side of the warning block in the center, the output voice is "process in the left direction, 7 m is left until the next QR code Braille block".

(3) When the detected warning block position is on the right side of the warning block in the center, the output voice is "process in the direction via the next warning block on the left, 15 m is left until the next QR code Braille block".

(4) When the detected warning block position is in front of the warning block in the center, the output voice is "proceed in the left direction via the next warning block behind".

Next, it is determined whether or not the destination is reached (S610). Whether or not the destination is reached is determined by the application of the smartphone 10. That is, the determination is made based on whether or not the acquired QR code information is a QR code Braille block of the destination.

When it is determined in the processing of S610 that the destination is not reached yet, the voice output processing unit 35 issues a voice instruction on the direction and distance to the next QR code Braille block, and the processing returns to the Braille block search process of S605.

When it is determined in the processing of S610 that the destination is reached, the road guidance system using the external information is terminated (S611).

In the case of the hearing-impaired person, the healthy person, etc. other than the visually impaired person, the road guidance can be relatively easily implemented by characteristic information, map information (display of arrows in the walking direction, etc. is effective), etc. on the display screen of the smartphone 10 without detecting the Braille block.

As an application of the present embodiment, when a device that acquires high GPS accuracy (about cm) is provided at a low price, the device is incorporated in a smartphone and the position of each Braille block can be clearly determined. In this case, the position of the QR code Braille block can be identified from arrangement information of the Braille block stored in the smartphone, and the smartphone can be guided directly above the QR code Braille block. In addition, the direction and distance to the next QR code Braille block can be indicated. Therefore, the convenience is further improved.

Eighth Embodiment

In the first to seventh embodiments, holding and using the smartphone is assumed. However, in the present embodiment, the case other than the smartphone will be described.

As an application example other than the smartphone, a conventional mobile phone or an information terminal such as a tablet terminal or a notebook PC can be considered. However, considering that the visually impaired person holds a white cane, it is preferable to apply a conventional mobile phone or a tablet terminal.

Naturally, a notebook PC can be applied to the hearing-impaired person, the healthy person, etc. other than the visually impaired person.

Figure 13:
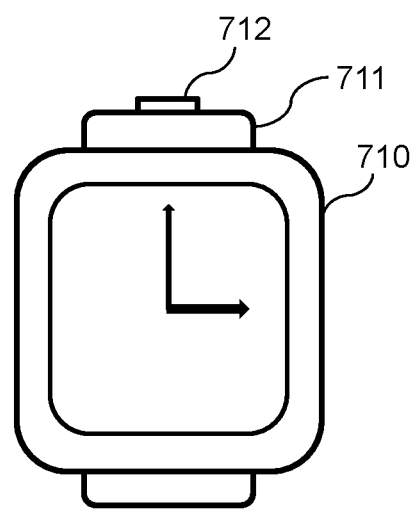
FIG. 13 is a schematic view of a smart watch having a camera in an eighth embodiment.

FIG. 13 is a schematic view of a smart watch having a camera when the smart watch having the camera is applied as another application example other than the smartphone in the present embodiment. As illustrated in FIG. 13, a smart watch 710 has a photographing unit built in a belt 711, and photographing can be performed using a camera lens 712.

In addition, without depending on the walking direction, it is possible to associate a characteristic portion of the smart watch 710 with a direction thereof to perform voice guidance. For example, when the camera lens side of the smart watch 710 is directed upward, the front, back, left, and right can be associated with a direction of the camera lens side and replaced.

It is possible to express the front, back, left, and right by using a direction of a minute hand of a clock. For example, the front is replaced with and expressed as the 12 o'clock position, the right direction is replaced with and expressed as the 3 o'clock position, the back is replaced with and expressed as the 6 o'clock position, and the left direction is replaced with and expressed as the 9 o'clock position.

As described above, in the present embodiment, the same effect as that of the above-described embodiments can be obtained by photographing the QR code in the Braille block to which the QR code is affixed using the smart watch having the camera.

Ninth Embodiment

The present embodiment describes the case where an HMD (Head Mounted Display) is applied as an application example other than the smartphone.

Figure 14:
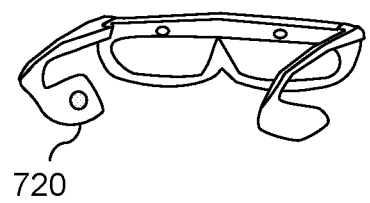
FIG. 14 is a schematic view of an HMD in a ninth embodiment.

FIG. 14 is a schematic view of the HMD when the HMD is applied as another application example other than the smartphone in the present embodiment.

As illustrated in FIG. 14, an HMD 720 is a non-transparent type HMD, and a photographing unit is built therein so that photographing can be performed. By photographing the QR code in the Braille block to which the QR code is affixed, it is possible to obtain the same effect as that of the above-described embodiments.

When the non-transparent type HMD 720 is applied, a direction in which a face wearing the non-transparent type HMD 720 is facing can be determined, so that the walking direction can be indicated in the front, back, left, and right directions with respect to a face direction.

Naturally, a transparent type HMD can be applied to the hearing-impaired person, the healthy person, etc. other than the visually impaired person. In the case of the hearing-impaired person, the healthy person, etc. other than the visually impaired person, a real-space image and an augmented reality (AR: Augmented Reality) generated image (avatar) by a computer can be superimposed and further displayed on the display screen of the transparent type HMD. Therefore, the effect of being able to provide road guidance by the avatar is added.

Note that a connecting portion of the QR code, a rectangular iQR code standard, etc. are used to increase information stored in the QR code.

Even though the embodiments of the invention have been described above, it is natural that a configuration for implementing the technology of the invention is not limited to the embodiments, and various modifications can be considered. For example, it is possible to replace a part of a configuration of a certain embodiment with a configuration of another embodiment, and it is possible to add a configuration of a certain embodiment to a configuration of another embodiment. All of these modifications belong to the category of the invention. In addition, the numerical values, messages, etc. appearing in the text and figures are merely examples, and the effects of the invention are not impaired even when different ones are used.

In addition, even though an example using the QR code has been described in the above description, it is natural that the effects of the invention can be obtained even when a 2D code referred to as a so-called matrix type 2D code is used instead of the QR code. The matrix type 2D code is surrounded by a square frame or an L-shaped frame to facilitate the position detection of the 2D code, or a characteristic mark referred to as a finder pattern (cutout symbol) is disposed inside a symbol, and thus the reference direction of the 2D code can be apprehended by detecting this code.

Further, the above-mentioned functions of the present embodiment can be implemented by hardware by designing a part or all of the functions using, for example, an integrated circuit. Moreover, hardware and software may be used together. The software may be stored in the program unit 41, etc. of the smartphone in advance at the time of product shipment. After the product is shipped, the software may be acquired from various server devices, etc. on the Internet. Further, the software may be provided and acquired by a memory card, an optical disc, etc.

REFERENCE SIGNS LIST

1 Warning block
2 Dot-shaped protrusion
3 QR code
4 to 6 Cutout symbol
10 Smartphone
30 Control unit
31 Various sensor information acquisition unit
32 Photographing processing unit
33 QR code analysis processing unit
34 QR code information storage unit
35 Voice output processing unit
36 Communication processing unit
101 Guidance block
102 Rod-shaped protrusion
103 QR code
104 to 106 Cutout symbol
502 Road guidance server
710 Smart watch
720 HMD

The invention claimed is:

1. A road guidance system comprising:
a tactile paving tile to which a two-dimensional code is affixed;
a road guidance server storing arrangement information of the tactile paving tile; and
a mobile information terminal connected to the road guidance server via a network,
wherein the mobile information terminal includes:
a photographing processing unit;
a two-dimensional code analysis processing unit that analyzes the two-dimensional code;
a voice output processing unit;
an information acquisition unit; and
a control unit,
wherein the information acquisition unit acquires a current position of the mobile information terminal, and
wherein the control unit 1) identifies, based on the current position of the mobile information terminal and the arrangement information of the tactile paving tile, a predetermined tactile paving tile disposed at a position closest to the current position of the mobile information terminal, 2) provides, via the voice output processing unit, voice guidance on a distance from the current position of the mobile information terminal and a walking direction of a user holding the mobile information terminal, 3) when the mobile information terminal detects a presence of the predetermined tactile paving tile, analyzes, using the two-dimensional code analysis processing unit, the two-dimensional code affixed to the predetermined tactile paving tile photographed by the photographing processing unit to obtain two-dimensional code information, 4) generates road guidance information generated based on the walking direction of the user holding the mobile information terminal from the obtained two-dimensional code information, and 5) outputs the road guidance information from the voice output processing unit as a voice.

2. The road guidance system according to claim 1, wherein the control unit generates the road guidance information based on a reference orientation of the two-dimensional code and the walking direction of the user.

3. The road guidance system according to claim 1, wherein the tactile paving tile is a warning block.

4. The road guidance system according to claim 1, wherein the tactile paving tile is a guidance block.

5. The road guidance system according to claim 1, further comprising a plurality of tactile paving tiles, the two-dimensional code being affixed to each of the tactile paving tiles.

6. The road guidance system according to claim 1,
wherein the road guidance server further stores information related to a road guidance, and
wherein the control unit downloads information necessary for the road guidance from the road guidance server to the mobile information terminal, and performs the road guidance using the downloaded information necessary for the road guidance and the generated road guidance information.

7. A mobile information terminal used for a road guidance system, the road guidance system including i) a tactile paving tile to which a two-dimensional code is affixed, ii) a road guidance server storing arrangement information of the tactile paving tile, and iii) the mobile information terminal connected to the road guidance server via a network, the mobile information terminal comprising:
  a photographing processing unit;
  a two-dimensional code analysis processing unit that analyzes the two-dimensional code;
  a voice output processing unit;
  an information acquisition unit; and
  a control unit,
  wherein the information acquisition unit acquires a current position of the mobile information terminal, and
  wherein the control unit 1) identifies, based on the current position of the mobile information terminal and the arrangement information of the tactile paving tile, a predetermined tactile paving tile disposed at a position closest to the current position of the mobile information terminal, 2) provides, via the voice output processing unit, voice guidance on a distance from the current position of the mobile information terminal and a walking direction of a user holding the mobile information terminal, 3) when the mobile information terminal detects a presence of the predetermined tactile paving tile, analyzes, using the two-dimensional analysis processing unit, the two-dimensional code affixed to the predetermined tactile paving tile photographed by the photographing processing unit to obtain two-dimensional code information, 4) generates road guidance information generated based on the walking direction of the user holding the mobile information terminal from the obtained two-dimensional code information, and 5) outputs the road guidance information from the voice output processing unit as a voice.

8. The mobile information terminal according to claim 7, wherein the control unit generates the road guidance information based on a reference orientation of the two-dimensional code and the walking direction of the user.

9. The mobile information terminal according to claim 7, wherein the control unit downloads information necessary for a road guidance from the road guidance server, and performs the road guidance using the downloaded information necessary for the road guidance and the generated road guidance information.

* * * * *